(12) United States Patent
Byren et al.

(10) Patent No.: US 6,809,307 B2
(45) Date of Patent: Oct. 26, 2004

(54) SYSTEM AND METHOD FOR EFFECTING HIGH-POWER BEAM CONTROL WITH ADAPTIVE OPTICS IN LOW POWER BEAM PATH

(75) Inventors: Robert W. Byren, Hermosa Beach, CA (US); Alvin F. Trafton, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 242 days.

(21) Appl. No.: 09/965,764

(22) Filed: Sep. 28, 2001

(65) Prior Publication Data

US 2003/0062468 A1 Apr. 3, 2003

(51) Int. Cl.[7] .................................................. G01J 1/20

(52) U.S. Cl. ..................................... 250/201.9; 356/521

(58) Field of Search ............................... 356/521, 121, 356/451, 452; 250/216, 237 G, 237 R, 201.9; 359/244–245, 249

(56) References Cited

U.S. PATENT DOCUMENTS

| | | | | |
|---|---|---|---|---|
| 3,764,213 A | * | 10/1973 | O'Meara | 356/5.1 |
| 4,321,550 A | * | 3/1982 | Evtuhov | 359/326 |
| 4,326,800 A | | 4/1982 | Fitts | |
| 4,734,911 A | | 3/1988 | Bruesselboch | |
| 4,798,462 A | * | 1/1989 | Byren | 356/139.08 |
| 4,996,412 A | | 2/1991 | Anafi et al. | |
| 5,018,835 A | | 5/1991 | Dorschner | |

(List continued on next page.)

FOREIGN PATENT DOCUMENTS

EP  0 952 642  10/1999

OTHER PUBLICATIONS

Basov et al, "Inversion of Wavefront in SMBS of a Depolarized Pump," JTEP Lett. vol. 28, No. 4, pp. 197–201, Aug. 1978.

(List continued on next page.)

Primary Examiner—David Porta
Assistant Examiner—Patrick J. Lee
(74) Attorney, Agent, or Firm—John E. Gunther; Colin Raufer; Glenn H. Lenzen, Jr.

(57) ABSTRACT

A beam control system and method which utilizes the wavefront reversal property of nonlinear optical phase conjugation to permit incorporation of a liquid crystal OPA within the low power legs of the beam control system, thereby affording the advantages of the OPA without the power limitations thereof. The invention is adapted for use with a beacon for illuminating a target with a first beam of electromagnetic energy. The system includes a telescope (1010) for receiving a target return comprising a reflection of the first beam from the target. An optical phased array (1050) is included for correcting for aberrations in the wavefront of the target return. A mechanism is included for ascertaining the correction applied by the optical phased array to the target return. The mechanism applies the correction to a third beam which ultimately is the output beam. In the illustrative embodiment, the first beam of electromagnetic energy is optical energy and the mechanism includes a first phase conjugate mirror (1091) adapted to conjugate electromagnetic energy output by the third mechanism and a second phase conjugate mirror (1092) adapted to conjugate the output of the first phase conjugate mirror. The fourth mechanism further includes an amplifier (1088) for boosting the signal output by the second phase conjugate mirror (1092) to provide the output beam.

19 Claims, 10 Drawing Sheets

U.S. PATENT DOCUMENTS

| | | | |
|---|---|---|---|
| 5,090,795 A | | 2/1992 | O.Meara et al. |
| 5,093,740 A | | 3/1992 | Dorschner |
| 5,093,747 A | | 3/1992 | Dorschner |
| 5,126,869 A | | 6/1992 | Dorschner et al. |
| 5,198,653 A | * | 3/1993 | Shen et al. ............... 250/201.9 |
| 5,253,033 A | | 10/1993 | Lipchak |
| 5,378,888 A | * | 1/1995 | Stappaerts ............... 250/201.9 |
| 5,396,364 A | * | 3/1995 | O'Meara et al. ............ 359/292 |
| 5,410,397 A | | 4/1995 | Toeppen |
| 5,483,342 A | | 1/1996 | Rockwell |
| 5,694,408 A | | 12/1997 | Bott et al. |
| 5,717,516 A | * | 2/1998 | Klein et al. ................. 359/334 |
| 5,886,800 A | | 3/1999 | Aprahamian et al. |
| 5,964,701 A | | 10/1999 | Asada |
| 6,404,784 B2 | * | 6/2002 | Komine ......................... 372/9 |

OTHER PUBLICATIONS

Betin, Matthews, and Mangir, "Vector Phase Conjugation with Loop Laser Geometry," CLEO '97 Proceedings, Paper No. CTuL4, pp. 102–103, (1997).

E. Treacy, "Optical Pulse Compression with Diffraction Gratings," IEEE J. of Quantum Electronics, vol. QE–5, No. 9, p. 454, Sep. 1969.

Ma S et al: "Atmospheric–Turbulence Compensation With Self–Referenced Binary Holographic Interferometry", Journal of the Optical Society of America, Washington, U.S., vol. II, No. 1, 1994, pp. 428–433, XP000418849, ISSN: 1084–7529, p. 428–429; Fig. 1.

* cited by examiner

SYSTEM AND METHOD FOR EFFECTING HIGH-POWER BEAM CONTROL WITH ADAPTIVE OPTICS IN LOW POWER BEAM PATH

BACKGROUND OF THE INVENTION

Field of the Invention

The present invention relates to optics. More specifically, the present invention relates to systems and methods for directing and correcting high-power beams of electromagnetic energy.

Description of the Related Art

Directed energy weapons and specifically high-energy laser (HEL) weapons are being considered for variety of military applications with respect to a variety of platforms, e.g., spaceborne, airborne and land based systems to name a few. These weapons generally involve the use of the laser or other source of a high-power beam to track and destroy a target. To achieve mission objectives, directed energy weapons must be accurately steered and optimally focused. Steering involves line-of-sight control and focusing, with respect to HEL weapons, involves wavefront error correction. Currently, wavefront error correction is typically achieved using adaptive optics. The current state of the art in laser beam control adaptive optics requires placing one or more deformable mirrors within the highest intensity portion of the beam path. The conventional deformable mirror is typically a large element with a thin face sheet and a number of piezoelectric actuators. Actuators are located behind the face sheet and are electrically driven to push and pull on the surface thereof to effect the deformation required to correct wavefront errors in an outgoing beam. The size of the active region of the deformable mirror must accommodate the full size of the high power laser beam in the high power Coudé path prior to expansion via an output telescope.

In addition, one or more fast steering mirrors may be used to correct for tilt and direct the line-of-sight. A course gimbal may be employed to correct for line-of-sight errors as well. A plurality of wavefront sensors are typically employed along with an aperture sharing element (ASE). The ASE allows a single shared aperture to be advantageously used for both the low power sensors and the high power output laser beam, ensuring that the path through the atmosphere taken by the high power beam is the same as that taken by the wavefront sensor and that the correction applied to the shared atmospheric path is optimal for the high-power beam.

Unfortunately, the use of delicate optical devices in the path of a high-power beam is problematic. This is due to the fact that the high-power beam will heat and distort the optical element unless the element is actively cooled or has a coating with a very low optical absorption coefficient. The most durable coatings require a high temperature application process. Deformable mirrors are typically coated after the face sheet is bonded to the actuators, which limits the maximum temperature to which the deformable mirror assembly may be exposed without degrading the bond. Therefore, coatings may need to be applied at lower than optimal temperature using more complex coating processes, thereby reducing durability and/or increasing manufacturing cost.

In addition, conventional adaptive optics systems using deformable mirrors are limited in performance. Conventional deformable mirrors systems are limited with respect to the speed at which the mirror drive signals are computed and the reaction speed of the deformable mirror mechanism to correct for aberrations. There is also a limitation with respect to the number actuators that can be used. The number of actuators that may be used determines the resolution or "order" of the mirror. The stroke of the conventional deformable mirror is limited. "Stroke" relates to the amount of mirror surface deflection that may be achieved before either the piezoelectric actuators exceed their dynamic range or the face sheet begins to fail. Further, a conventional continuous face sheet deformable mirror cannot correct for a pathology in the spatial phase pattern, such as a branch point or an abrupt phase discontinuity. A branch point is a "singularity" in a deeply scintillated phase pattern caused by atmospheric turbulence over a long propagation path in which the phase monotonically increases around a zero amplitude point like a corkscrew, thereby requiring an abrupt $2\pi$ phase correction within the spatial phase pattern. Abrupt phase discontinuities may be caused by the optical discontinuities between segments of a multi-segment primary mirror.

In U.S. Pat. No. 5,694,408, issued Dec. 2, 1997, (the teachings of which are incorporated herein by reference), Bott, Rice, and Zediker appear to disclose a scheme which allows the deformable element to be placed in the low intensity region between a master oscillator and an array of fiber power amplifiers. The approach is to pre-distort the phase of the oscillator beamlets after separation in a distribution network and before injection into the fiber amplifier array, such that the pre-distortion corrects both the piston error between the individual fibers and optical aberrations in the atmosphere. However, this scheme is practical only with a coherently-combined array of single-mode fiber amplifiers, as each fiber channel is correctable in piston only, not high order. Also, this scheme is not applicable to multi-mode laser media such as large core fiber amplifiers or bulk media lasers as contemplated for weapon class HEL devices and may not be scaleable to high power levels due to random, high frequency phase noise caused by pump-induced temperature fluctuations within the fibers.

In U.S. Pat. No. 5,090,795, issued Feb. 25, 1992, the teachings of which are incorporated herein by reference, O'Meara and Valley appear to disclose several related schemes for using a liquid crystal light valve (LCLV) in a self-correcting adaptive optics system. This approach, however, places the LCLV in the high power beam path and is therefore limited by the damage susceptibility of the liquid crystal material.

Accordingly, a need remains in the art for a fast, large-stroke, high spatial bandwidth or high order system or method for effecting wavefront correction of a high-power beam. Ideally, such a wavefront correction system or method would operate moduli $2\pi$, i.e., would accommodate an instantaneous $2\pi$ phase jump anywhere within the phase pattern.

SUMMARY OF THE INVENTION

The need in the art is addressed by the beam control system and method of the present invention. The invention is adapted for use with a system for illuminating a target with a first beam of electromagnetic energy. Several embodiments are disclosed herein. In a preferred embodiment, the inventive system includes a first mechanism for receiving a first beam of electromagnetic energy; a second mechanism for detecting aberrations in the first beam; a third mechanism responsive to the second mechanism for generating a second beam that is at least partially compensated with respect to the aberrations detected; and a fourth mechanism for amplifying the second beam to provide an output beam.

In a more specific embodiment, the inventive system includes a first mechanism for receiving a target return comprising a reflection of the first beam from the target. A second mechanism is included for correcting for aberrations in the wavefront of the target return. A third mechanism is included for ascertaining the correction applied by the second mechanism to the target return. A fourth mechanism applies the correction to a third beam, with the third beam ultimately being an output beam. In the more specific embodiment, the first beam of electromagnetic energy is optical energy and the first mechanism is a telescope. The fourth mechanism includes a first phase conjugate mirror adapted to conjugate electromagnetic energy output by the third mechanism and a second phase conjugate mirror adapted to conjugate the output of the first phase conjugate mirror. The fourth mechanism further includes an amplifier for boosting the signal output by the second phase conjugate mirror to provide the output beam.

In a preferred embodiment, an outcoupling element is disposed between the first mechanism and the second mechanism. In the best mode, the outcoupling element is an aperture sharing element (ASE) and the second mechanism is an optical phased array. A wavefront error sensor is provided to receive a signal output by the optical phased array and provide a wavefront error signal in response thereto. A processor is included and programmed to respond to the wavefront error signal and provide a correction signal to the optical phased array in response thereto. The third mechanism is implemented with a master oscillator adapted to provide a low-power reference beam. The reference beam illuminates the optical phased array and provides a target-path wavefront error corrected signal in response thereto. In this best-mode embodiment, the oscillator beam does not produce a correction detection signal, but rather produces the reference signal that is amplified to generate the actual high-power beam. This signal illuminates the back of the aperture sharing element and back reflects off the front surface of the ASE. This signal, in turn, is conjugated by the first phase conjugate mirror and transmitted through the ASE to the second phase conjugate mirror. The second phase conjugate mirror conjugates the transmitted signal thus canceling the effect of the first phase conjugation process. This signal is then amplified and front reflected off the front surface of the ASE to provide the output beam to the telescope and beam director, where it is directed to the target. As the front and back reflections off the front surface of the ASE are phase conjugates of one another, any reflective distortion due to this element is removed. Refractive distortions in the ASE, laser amplifiers, and other optical elements are also removed in this embodiment via the wavefront reversal properties of the first and second phase conjugate mirrors. Consequently, the output beam is compensated for the optics of the system and includes a correction for the atmosphere provided by the optical phased array.

The invention uses the wavefront reversal property of nonlinear optical phase conjugation to permit incorporation of a photonic spatial light modulator, such as a liquid crystal optical phased array (OPA) or a micro electro-mechanical system within the low power legs of the beam control system, thereby affording the advantages of the OPA without the power limitations.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

1. Conventional HEL Beam Control Architectures

Figure 1:
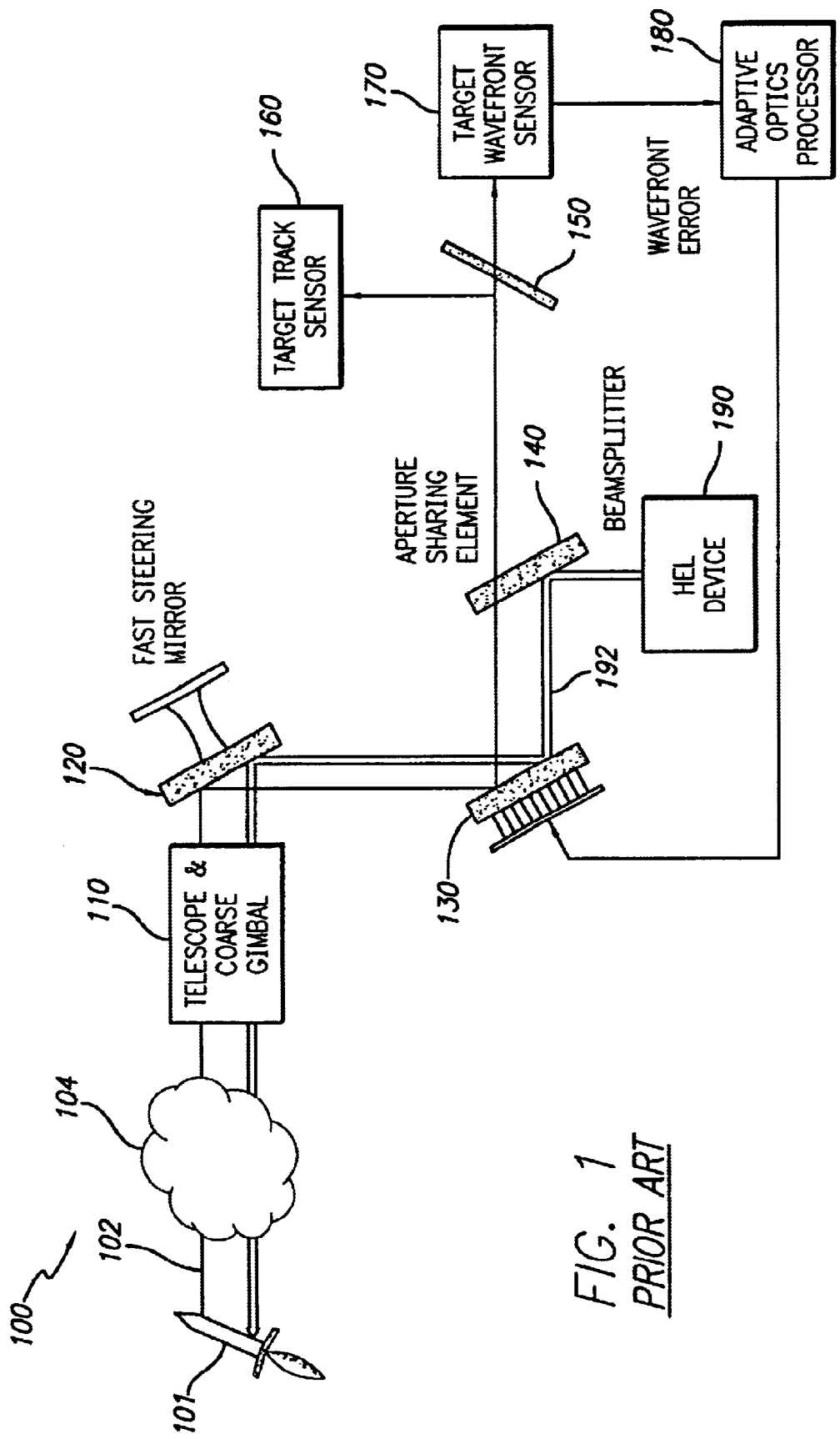
FIG. 1 is a simplified optical schematic of a conventional HEL beam control architecture.

A simplified optical schematic of a conventional High Energy Laser (HEL) beam control architecture 100 is shown in FIG. 1. A HEL beam director, generally consisting of a Telescope and multi-axis Coarse Gimbal 110, is commanded to the line-of-sight of a Target 101 based on an external cue (acquisition or coarse tracking system not shown). A Target Track Sensor 160 acquires the target and begins to close a track servo loop (not shown) maintaining line-of-sight to the target 101. Optical aberrations along the line-of-sight caused by atmospheric turbulence 104 along the path to the target 101 and the aero-optic effects due to the boundary layer surrounding the beam director turret (moving platforms only, not shown) distort the image of the target 101, causing relatively poor tracking performance. The Target Wavefront Sensor 170 measures this wavefront (or phase) distortion, and an Adaptive Optics Processor 180 closes an adaptive optics servo loop around a Deformable Mirror (DM) 130 effectively nulling the wavefront (or phasefront) error caused by the atmosphere. The Target Wavefront Sensor 170 can employ an active sensor with a beacon illuminator (not shown) to measure either subaperture tilts (Shack-Hartmann sensor) or optical phase (lateral shearing interferometer or transform wavefront sensor). The Target Wavefront Sensor 170 can also employ imaging sensors at different focal positions to infer phase from the passive target imagery using "phase diversity" techniques. The AO loop corrects the aberrations along the target path allowing the tracker to operate at full performance. It also corrects the portion of the beam path for the High Energy Laser (HEL) Device 190 from the Aperture Sharing Element (ASE) 140 to the Target 101, enabling high beam intensity (high Strehl ratio) and low beam wander (low angular jitter) on the target 101. It does not correct for the non-common path errors in the ASE 140 or distortions in the HEL beam path from the HEL Device 190 to the ASE 140.

For most adaptive optics applications, it is advantageous to place the deformable elements and wavefront sensors at pupil points within the optical path. This ensures good mapping of the sensed wavefront errors to the actuator locations of the Deformable Mirror. Pupil relay or reimaging optics, which are not shown in the figure, may therefore be employed in the low-power beam path to locate the pupil at the Deformable Mirror 130 surface to the Target Wavefront Sensor 170 for best adaptive optics correction performance.

Fast Steering Mirrors (120) may be used in conjunction with a stable platform and internal active auto-alignment system (not shown) to provide wide bandwidth correction for line-of-sight disturbances caused by imperfect isolation of base motion, structural compliance, gimbal bearing runout, and gimbal axis non-orthogonality. The Fast Steering Mirror 120 can also be used to off-load tilt corrections from the DM 130, thereby minimizing the stroke requirement of the DM actuators.

The theory of operation and description of key components for a conventional HEL beam control system may be found in several published references, including:

1. Tyson and Ulrich, "Adaptive Optics", The Infrared and Electro-Optical Handbook, Volume 8, Chapter 2, ERIM, Ann Arbor, Mich., pp. 165–237, (1993) and
2. Golnik, "Directed Energy Systems", The Infrared and Electro-Optical Handbook, Volume 8, Chapter 5, ERIM, Ann Arbor, Mich., pp. 403–480, (1993).

This conventional approach suffers from several limitations. First, the Deformable Mirror 130 is located in the highest intensity portion of the HEL beam path 192. This is a problem for traditional DM devices because the mirror facesheet is thin and cannot be easily cooled. It is therefore subject to thermal loading distortions and damage if the reflective coatings are not extremely low absorption. Also, because the facesheet must be surface figured after the actuators are attached (bonded), the coating must be applied at sufficiently low temperature that the actuators do not de-bond in the process, making the manufacturing process difficult and the coatings less durable and less resistant to laser-induced damage.

Second, the pitch (physical spacing) of the DM actuators limits the feature size of the spatial wavefront error that can be corrected. Wavefront error features smaller than half the actuator spacing cannot be corrected by a conventional DM.

Third, traditional DMs using piezoelectric actuators bonded to glass face sheets are limited in stroke and bandwidth by the strength of the face sheet and the mechanical nature of the device. The servo bandwidth is further limited by the throughput of the Adaptive Optics Processor 180, which typically employs a parallel matrix multiplication process to calculate the actuator commands required to control the shape (surface figure) of the face sheet. Note that for optimal correction, this shape should be the phase conjugate of the incident wavefront, with no temporal latency. Non-mechanical beam steering and phase modulation approaches, such as liquid crystal light valve, spatial light modulators, and optical phased arrays (described below), provide much larger stroke and much wider bandwidth performance than mechanical DMs and fast steering mirrors. Existing liquid crystal devices, however, have not yet been designed to withstand the high beam intensities necessary to control a HEL beam. For many applications such as astronomy and ground-based short-range HEL, the stroke and bandwidth of traditional DM devices are quite adequate. The stroke and bandwidth requirements for a high performance aircraft HEL, however, are much more demanding and would benefit from the non-mechanical approaches. The non-mechanical approaches offer improved performance at significantly reduced complexity and cost.

2. Fiber Amplifier Array with Integral Wavefront Control

Figure 2:
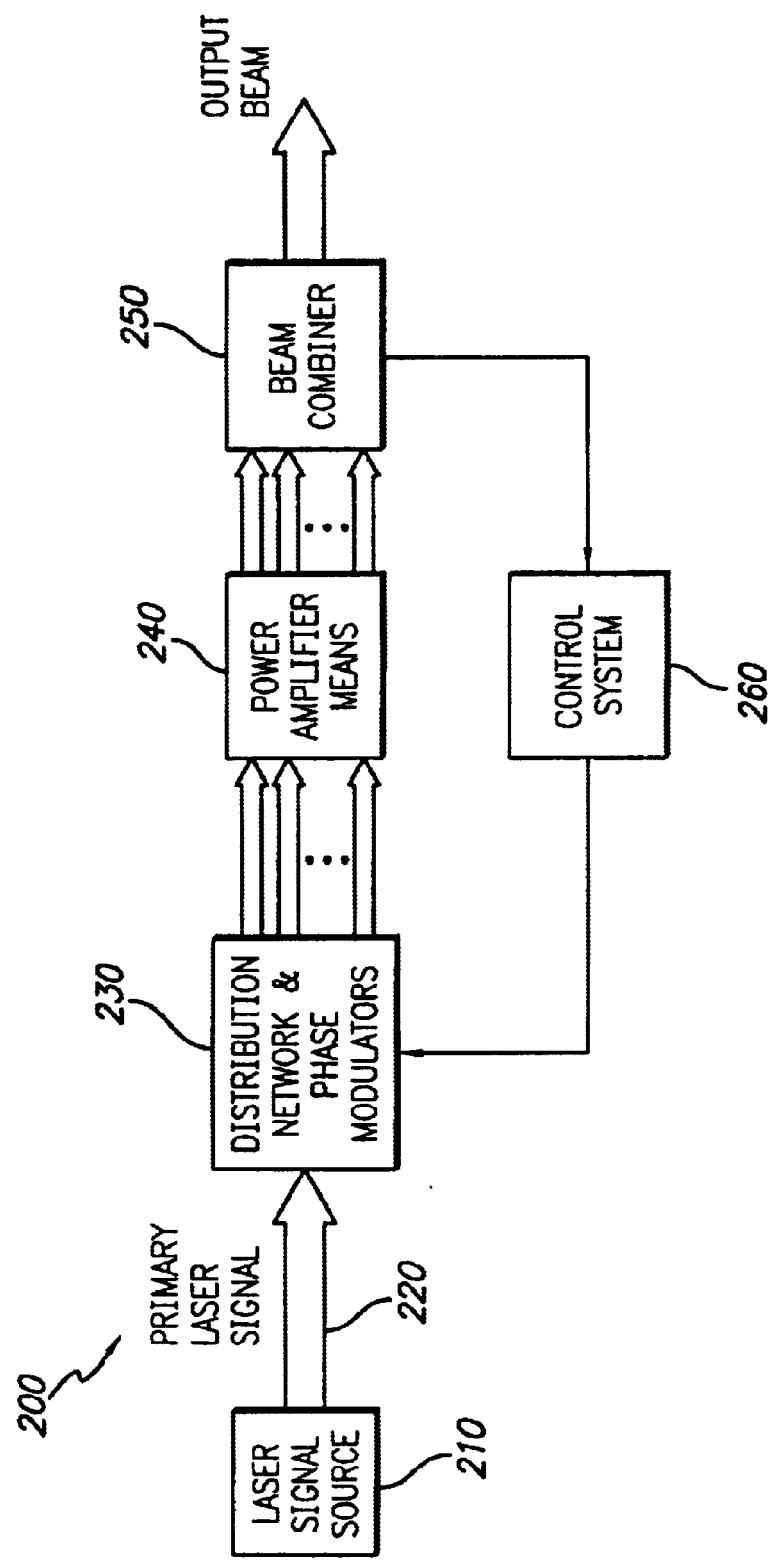
FIG. 2 shows an adaptive wavefront control loop implemented in accordance with the teachings of Bott et al.

In the above-referenced U.S. Pat. No. 5,694,408, entitled "Fiber Optic Laser System and Associated Lasing Method," Bott, Rice, and Zediker disclose a scheme for controlling the relative phase between different single-mode fiber laser amplifiers seeded from a common master oscillator. FIG. 1 of the patent, which is reproduced as FIG. 2 herein, shows an adaptive wavefront control loop (Control System 260), wherein the phase modulator is located on the low-power (Distribution Network 230) side of the fiber optic amplifier array (Power Amplifier Means 240). The Bott et al. patent specification further states "the predetermined wavefront imposed by the phase modulator array can be a phase conjugate wavefront which is designed to compensate or correct for undesirable phase perturbations introduced downstream by the atmosphere."

However, the phase modulation approach described by Bott et al., may not be scaleable to weapon-class HEL systems due to (1) the power limitations inherent in individual single-mode fiber amplifiers, (2) the problems associated with individually sensing the phase of a large number of array elements, and (3) random, high frequency phase fluctuations caused by fluctuations in the pump laser power delivered to the fiber.

The aforementioned Bott et al. patent specification also states "the number of elements of the phase modulator array defines the spatial resolution of the wavefront correction system," thereby highlighting the resolution limitation of the piston correction approach with single-mode fiber amplifiers.

3. Integrated Adaptive Optics Apparatus

Figure 3:
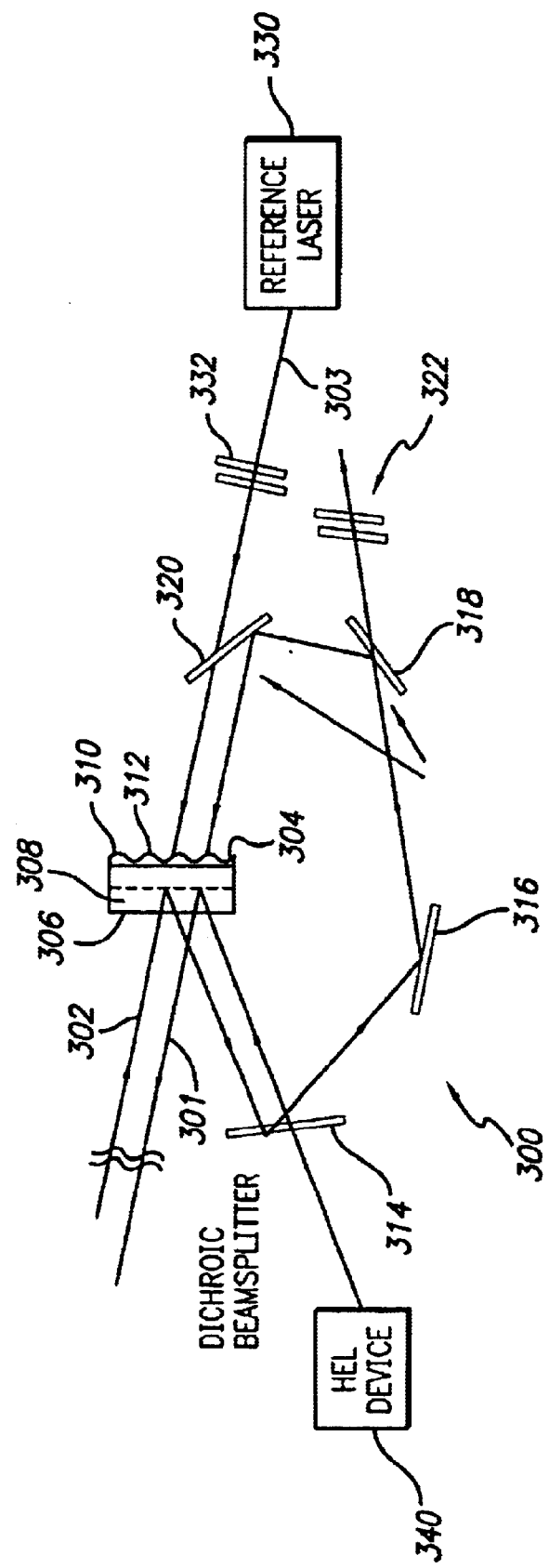
FIG. 3 shows an HEL-related embodiment utilizing the beam control approach described by O'Meara and Valley in U.S. Pat. No. 5,090,795.

FIG. 3 shows one HEL-related embodiment of the approach described by O'Meara and Valley in the above-referenced U.S. Pat. No. 5,090,795, entitled "Integrated Adaptive Optics Apparatus." In this approach, an Aberrated Wavefront 302 resulting, for example, from a target image passing through a turbulent atmospheric medium is incident on a Liquid Crystal Light Valve (LCLV) 304. Within the LCLV 304, the Aberrated Wavefront of this target beam 302 passes through a Liquid Crystal Layer 306, is reflected by an Internal Mirror Surface 308, and then makes a second pass through the Liquid Crystal Layer 306 and exits the LCLV 304. This target beam 302 then follows a loop path by reflecting off several beamsplitters and mirrors 314, 316, 318, and 320. At the last Dichroic Beamsplitter 320, the target beam 302 is combined with a beam 303 from a Reference Laser 330 having a Local Reference Plane Wave 332 and is caused to interfere with this plane wave at the rear surface of the LCLV. This creates a characteristic interference pattern 332 of light and dark fringes representative of the residual phase error of the reflected target beam. This interference pattern 332 illuminates the Photosensitive Layer 310, which can be a photoconductive surface. The interaction of the light pattern 332 with the Photosensitive Layer 310 modifies the properties of the Liquid Crystal Layer 306 in such a way that the optical path length through the Liquid Crystal Layer 306, at any point in the target beam, is determined by the strength of the light incident on the Photosensitive Surface 310 due to the Interference Pattern 312. When properly registered and properly calibrated, the self-correcting nature of the feedback loop within this integrated adaptive optics apparatus acts to null the phase errors on the back side of the LCLV 304, creating a uniform interference pattern and a Corrected Wavefront is produced.

For HEL beam control applications, a second laser beam 301 from a HEL Device 340, is injected in a backward direction into the loop path through a Dichroic Beamsplitter 314 and is reflected from the LCLV 304 to a target (not shown) through the aberration (not shown). The Liquid Crystal Layer 306 pre-distorts the HEL beam 301 in such a way that the aberration is compensated at the target providing high beam intensity for weapon effectiveness. The primary advantage of this approach over conventional DMs and fast steering mirrors is that it does not require any electronic signal processing to implement the adaptive optics correction. It can therefore operate with high spatial frequencies and with temporal correction bandwidths limited only by the interference pattern formation process and response speed of the Photosensitive and Liquid Crystal Layers 310, and 306 respectively.

This approach has several disadvantages for HEL weapon applications. First, the LCLV 304 is placed in the highest intensity part of the HEL beam 301 making it susceptible to laser-induced damage. The performance of the LCLV 304 is limited in dynamic range, therefore a means of automatic intensity level control (not shown) may be required to optimize the contrast between the Local Reference Beam 303 and the target beam 302. The scheme is very sensitive to registration of the incident target beam 302 with the interference pattern 312 on the backside of the LCLV 304. Therefore, any static or dynamic misalignment of the numerous beamsplitter and mirror surfaces in the loop will produce uncompensatable errors. Finally, laser-induced thermal distortions in the first Dichroic Beamsplitter 314, which acts as an aperture sharing element (ASE) for the HEL Device, are not correctable.

4. Optical Phased Arrays

For several years, the present assignee Raytheon has pioneered the development of the liquid crystal based Optical Phased Array (OPA) and Raytheon is the assignee of numerous issued and pending patents in this field, e.g., U.S. Pat. Nos. 5,253,033; 5,126,869; 5,093,747; 5,093,740; 5,018,835; and 5,964,701, the teachings of which are hereby incorporated herein by reference. The present state of the art uses nematic liquid crystals that respond to a locally-applied electric field with a corresponding change in refractive index, thereby inducing a phase change in a transiting optical beam. The OPA devices can be configured to operate in either a reflective or transmissive mode. The devices built and demonstrated to date utilize a one-dimensional blazed Bragg grating to scan a narrowband laser beam across one directional axis. A pair of OPAs is used for two-directional scanning, and multiple pairs of OPAs are used for both coarse and fine scanning in two dimensions. The liquid crystals are polarization dependent and two devices with appropriate polarization analyzers and rotators are required to scan an unpolarized or randomly polarized beam.

A pixelated (or random access) liquid crystal based OPA, spatial light modulator, or light valve device is a desirable correction means for a high performance adaptive optics system. As stated earlier, liquid crystals have not been demonstrated to perform well in the high intensity region of an HEL beam. Therefore, a need has existed in the art for a beam control architecture wherein the deformable element is not placed within the high intensity region of the HEL beam.

5. Auto-Boresight Technique for Self-aligning Phase Conjugate Laser

In the 1970s and 1980s, Hughes Aircraft Company developed a number of advanced beam control concepts using nonlinear optical phase conjugation to correct some or all of the tilt and high order wavefront errors within the HEL beam path from the HEL device to the target.

Figure 4:
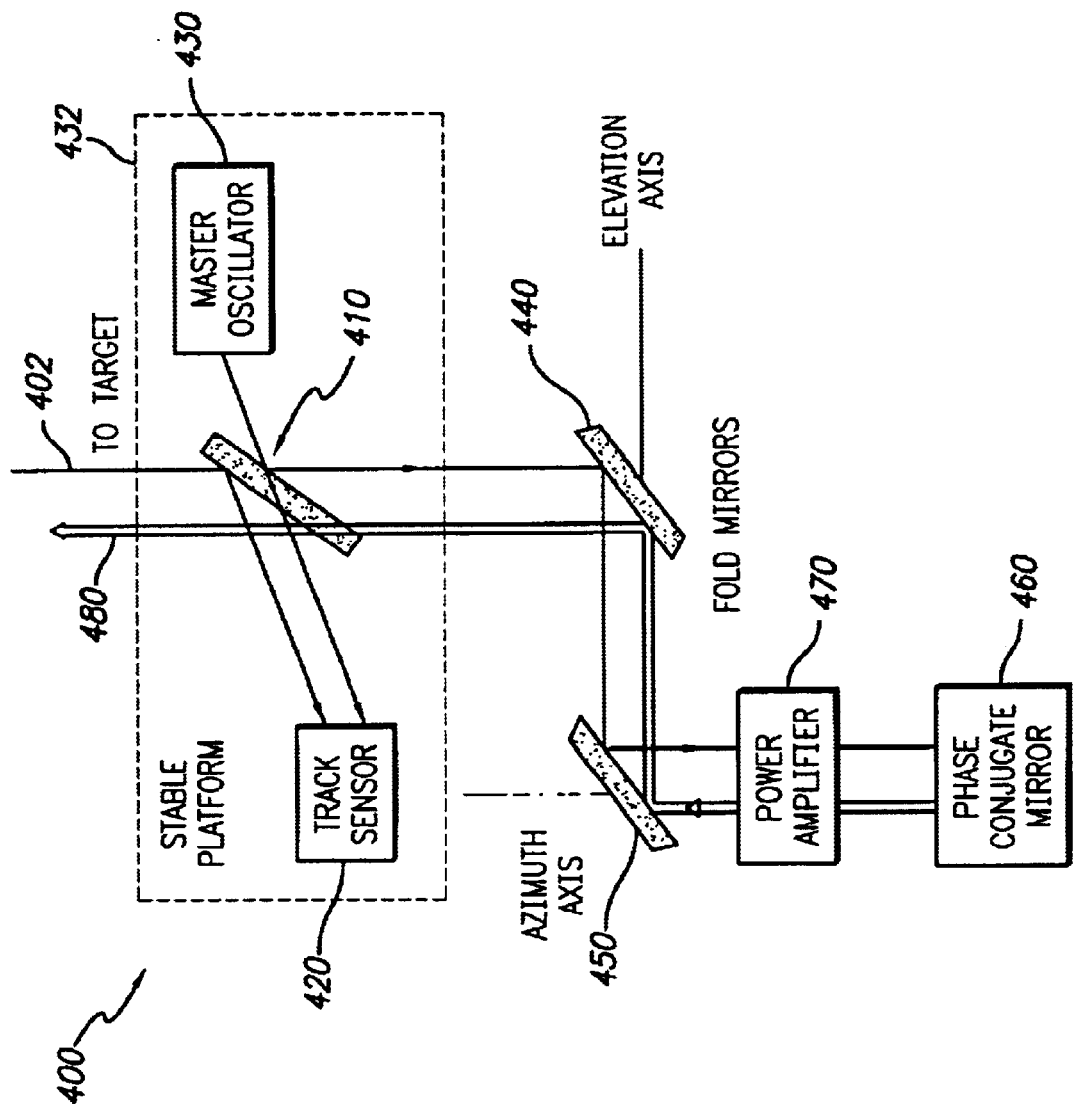
FIG. 4 is a block diagram showing a beam control approach described by Byren and Rockwell in U.S. Pat. No. 4,798,462.

FIG. 4 is a block diagram showing one such approach described by Byren and Rockwell in U.S. Pat. No. 4,798,462, entitled "Auto-boresight Technique for Self-aligning Phase Conjugate Laser" the teachings of which are incorporated by reference herein. In this system 400, an Output Coupling Beainsplitter 410, a Track Sensor 420, and laser Master Oscillator 430 are mounted on a Stable Platform 432 located on the inner gimbal (not shown) of a beam director (not shown). A two-pass laser power amplifier assembly, including one or more Power Amplifiers 470 and a Phase Conjugate Mirror 460, is located off-gimbal. The Phase Conjugate Mirror 460 compensates the beam 480 for angular tilt and jitter in the beam line-of-sight due to structural flexibility and motion of the stable platform 432 relative to the off-gimbal location oft he power amplifier assembly. Part of the Master Oscillator 430 output passes through the Output Coupling Beamsplitter 410 to the Track Sensor 420 to mark the far-field location of the amplified output beam 480. The Track Sensor 420 also views a target image after it is reflected by the Beamsplitter 410. The tracking system measures the angular displacement between the target aimpoint and the locus of the output beam as marked by the oscillator, and generates tracking error signals which are used to close a servo-mechanical feedback loop around the beam director gimbal drives. Unlike previous self-aligning laser concepts, pointing errors resulting from misalignment of the oscillator, the tracking sensor, and the beainsplitter are compensated by this technique.

The theory of operation for this technique is based on simple rules of geometry. Because the Track Sensor 420 image from the target and the Master Oscillator 430 beam reflect off opposite sides of the same Output Coupling Beamsplitter 410 (or opposite sides of the same surface of the Beamsplitter in another embodiment) and because the output beam from the phase conjugated power amplifier assembly is directed exactly opposite that of the reflected portion of the Master Oscillator 430 beam, the action of the track servo to null the angular error between the oscillator beam and track aimpoint also causes the high brightness output beam to be directed toward this same aimpoint on the target. Note that the Output Coupling Beamsplitter 410 in the figure serves two functions: (1) aperture sharing element and (2) outcoupler for laser device.

However, this technique does not provide for correction of wavefront errors outside the phase conjugated beam path defined between the Output Coupling Beamsplitter and the Phase Conjugate Mirror. These errors may result from atmospheric turbulence as well as non-common path errors in the Output Coupling Beamsplitter 410. Furthermore, this technique requires that the high power laser beam be transmitted through the multispectral Output Coupling Beamsplitter 410 used for aperture sharing, which may be undesirable for high power beams. These deficiencies and shortcomings are addressed by the teachings of the present invention.

A significant aspect of the present invention is the use of deformable optical elements in the low power path of a High Energy Laser (HEL) beam control subsystem to correct for atmospheric turbulence, aero-optic effects, and HEL beam path aberrations.

Figure 5:
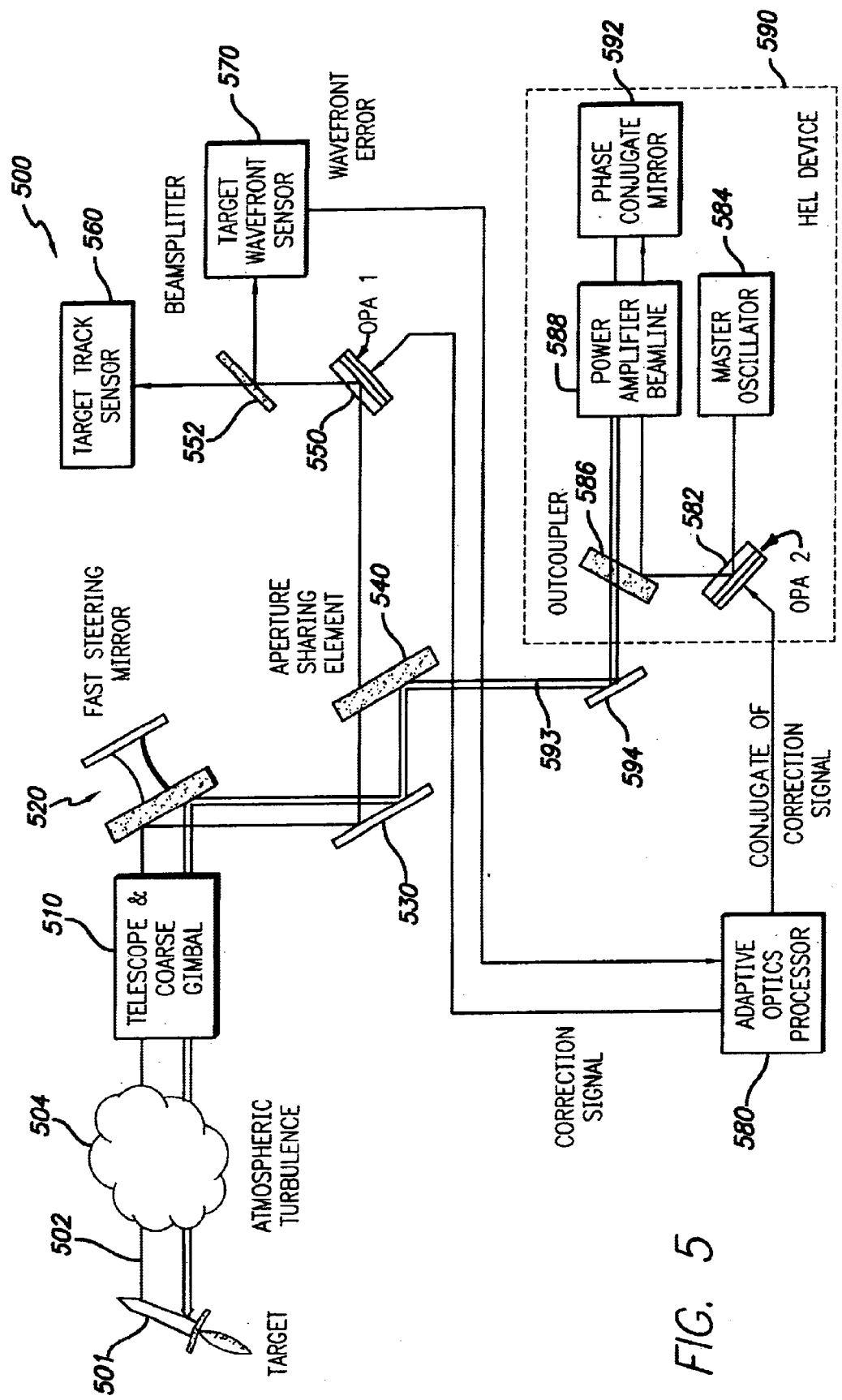
FIG. 5 is a simplified block diagram showing an optical schematic of an illustrative embodiment of a high energy laser beam control system architecture implemented in accordance with the teachings of the present invention.

FIG. 5 is a simplified block diagram showing an optical schematic of an illustrative embodiment of a high energy laser (HEL) beam control system architecture implemented in accordance with the teachings of the present invention. As in the conventional system depicted in FIG. 1, this HEL Beam Control System 500 uses Coarse Gimbals 510 in a beam director to point the beam toward the Target 501 based on an external cue. The Target Track Sensor 560 acquires the target and begins to close a track servo loop (not shown) maintaining line-of-sight to the Target 501. A Target Wavefront Sensor 570 measures the wavefront distortion along the path to the target and provides an electrical Wavefront Error signal to an Adaptive Optics Processor 580, which calculates the necessary electrical Correction Signals. Unlike the conventional system, two Correction Signals are sent to two different deformable optical elements, shown in the figure as Optical Phased Arrays (OPAs) 550 and 582. It should be appreciated that other deformable optical elements can be used, including but not limited to traditional deformable mirrors, spatial light modulators, liquid crystal light valves, and a variety of micro electro-mechanical systems (MEMS) without departing from the scope of the present teachings. Note that both OPAs 550 and 582 are placed in low power portions of the beam path and are therefore not subjected to the high intensities associated with the full-power HEL Device. The first OPA 550 is located in the low-power path between an Aperture Sharing Element 540 and a Beamsplitter 552, which splits the optical signal from the target between the Target Track Sensor 560 and the Target Wavefront Sensor 570. Again, laser illuminator beams, which may be used for active tracking and active wavefront sensing, are not shown. A servo loop (referred to in the art as the "target loop") is closed around OPA 1 (550), which alters the phase of the optical signal that is detected by the Target Track and Wavefront Sensors 560 and 570. For the most common "last-frame conjugation" Adaptive Optics (AO) correction scheme, the proper Correction Signal to OPA 1 (550) is that which nulls the Wavefront Error at the Target Wavefront Sensor 570 (i.e., plane-wave phasefront at Target Wavefront Sensor 570). When the servo loop is closed around OPA 1 (550), the optical aberrations along the path from the target to the Beamsplitter are corrected, and the Target Track Sensor 560 imagery is optimized for best tracking performance. Because the Target Wavefront Sensor 570 is always operated near null, the adaptive optics performance will remain good even under low signal-to-noise ratio (SNR) conditions. This is particularly important with Shack-Hartmann wavefront sensors.

The second OPA (OPA 2) numeral 582 is located within the HEL Device 590. In this embodiment, the HEL Device 590 is configured as a phase conjugate master oscillator power amplifier (PC MOPA) and OPA 2 (582) is inserted between the Master Oscillator 584 and the Outcoupler 586 in order to pre-distort the Master Oscillator beam prior to entering a phase conjugated amplifier beamline 588. Typically, the power amplifier beamline consists of multiple staged laser amplifier pumpheads arranged in series to provide both the gain and efficient power extraction needed in the phase conjugate master oscillator/power amplifier architecture. The Master Oscillator 584 can be a low-power single-mode laser resonator that generates a plane-wave output beam. Other configurations for the Master Oscillator 588 are also contemplated, including a separate PC MOPA, which is capable of providing a single transverse mode beam of higher power than the simple laser resonator configuration described earlier.

Pupil relay or reimaging optics in the low-power beam path (not shown) may be used to relay the optical pupil located on OPA 1 (550) to the Target Wavefront Sensor 570 and OPA 2 (582) for best adaptive optics correction performance.

For the "last-frame conjugation" AO correction scheme, the proper phase correction signal for OPA 2 (582) is the complex conjugate of the correction signal applied to OPA 1 (550), properly adjusted for magnification differences between the beam paths. The plane-wave nature of the Master Oscillator 584 beam is thereby altered by OPA 2 (582) to conform to the last phasefront from the Target 501 just upstream of OPA 1 (550). Note that the signals applied to OPA 1 and OPA 2 are phase conjugates of each other for this simplified embodiment. Additional embodiments are described in following paragraphs where this is not true.

It is important to note that the Correction Signal to OPA 2 (582) is applied open loop, that is, OPA 2 is in a slave mode to the operation of the "target loop" described above. OPAs are ideally suited to open-loop operation as the phase profile across the device can be well calibrated in terms of the applied voltage signal. OPAs are commonly operated open-loop for rapid beam scanning applications with excellent precision. The OPAs should have:

1. High resolution;
2. An ability to withstand master oscillator beam;
3. Sufficient bandwidth to accommodate wavelengths that pass through it; and
4. Low absorption so that self-heating does not corrupt performance.

This pre-distorted Master Oscillator beam is reflected by the Outcoupler element 586 that also functions to transmit the amplified beam. Several approaches for PC MOPA outcoupling are known in the art, including but not limited to polarization outcoupling (see for example U.S. Pat. No. 4,734,911) and interferometric outcoupling (see for example U.S. Pat. No. 5,483,342). The pre-distorted Master Oscillator beam that reflects off the Outcoupler 586 is amplified in a first pass through the Power Amplifier Beamline 588, where it is further distorted due to thermal lensing and wedging and/or thermally induced stress birefringence in the amplifying laser media. The Phase Conjugate Mirror 592 acts to reverse the phasefront of this amplified beam such that the portion of the distortion caused by the first pass through the Power Amplifier Beamline 588 is corrected during a second pass through the Power Amplifier Beamline 588. Depolarization of the beam caused by the first pass amplification may also be corrected within a "vector" Phase Conjugate Mirror, a process which is also known in the art (see for example Basov, et al, "Inversion of Wavefront in SMBS of a Depolarized Pump," JTEP Lett. Vol 28, No. 4, pp. 197–201, August 1978 or Betin, Matthews, and Mangir, "Vector Phase Conjugation with Loop Laser Geometry," CLEO '97 Proceedings, Paper No. CTuL4, pp. 102–103, 1997).

The result of double-passing the distorting Power Amplifier Beamline using a Phase Conjugate Mirror is that the phase of the high power beam emerging from the Outcoupler 586 is a phase conjugated replica of the pre-distorted Master Oscillator beam. By applying the proper pre-distortion as described above, the HEL beam will have the proper phase to correct for the Atmospheric Turbulence 504 and other optical aberrations in the common beam path from the Aperture Sharing Element 540 to the Target 501.

Fast Steering Mirrors may also be used in this embodiment for correction of line-of-sight disturbances as discussed earlier. OPA 2 (582) may be used to impart an angular offset between the line-of-sight of the high power laser beam and the target aimpoint to correct for target and platform motion.

One limitation of the simplified embodiment depicted in FIG. 5 for high power applications is that non-common path errors associated with the Aperture Sharing Element (ASE) 540 may not be adequately compensated for certain applications. These errors arise from distortion of the optical properties of the ASE caused by non-uniform heating of the coatings and optical substrate due to finite absorption of the HEL beam power. One type of distortion is warping of the reflecting surface of the ASE, causing distortion of the reflected HEL beam phasefront. Another type of distortion is refractive in nature, resulting from thermally-induced optical path length differences across the ASE aperture. These OPD errors distort the signal from the target as it is transmitted by the ASE 540 to the Target Track and Wavefront Sensors 560, 570. Note that the Target Track and Wavefront Sensor signals do not "see" the warped-surface distortion, and the HEL beam does not "see" the refractive distortion, hence the term "non-common path."

Several approaches are known in the art which attempt to correct for these ASE non-common path errors, the most common of which is the pseudo-conjugator.

Figure 6:
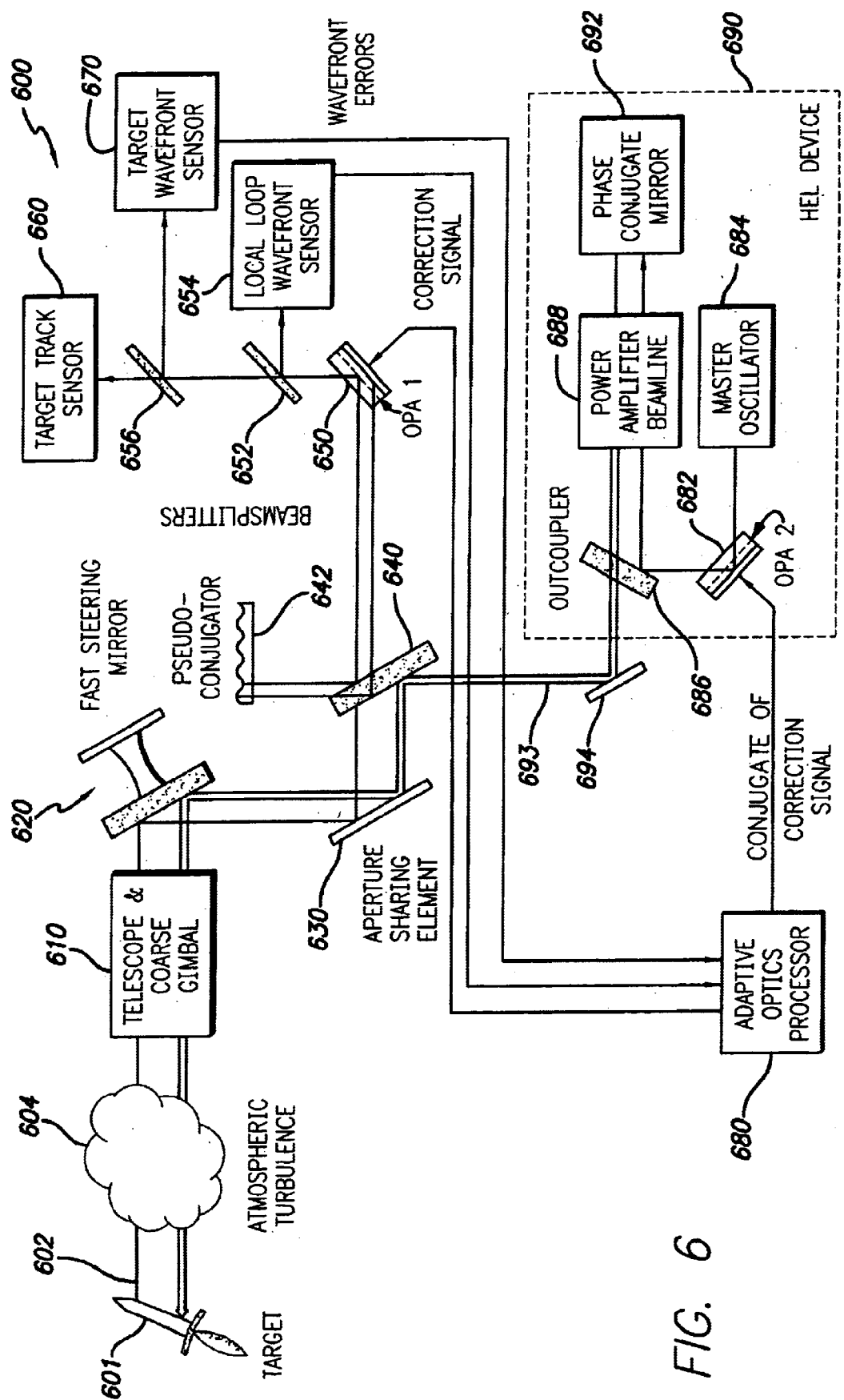
FIG. 6 is a simplified optical schematic block diagram showing a pseudo-conjugator approach for correcting non-common path errors in aperture sharing elements in accordance with the teachings of the present invention.

FIG. 6 is a simplified optical schematic block diagram showing a pseudo-conjugator approach for correcting non-common path errors in aperture sharing elements in accordance with the teachings of the present invention. In this System 600, a portion of a high power beam from the HEL Device 690 is transmitted through the ASE 640 and is then retro-reflected off a Pseudo-conjugator element 642, such as a high-resolution array of corner cubes. The Pseudo-conjugator 642 retro-reflects each ray (or beamlet) of the incident beam approximately along the same incident raypath, but does not alter the large-scale phasefront. This pseudo-conjugated beam is then reflected off the front surface of the ASE 640 and is further reflected off OPA 1 (650) and then a Beamsplitter 652 into a separate Local Loop Wavefront Sensor 654. The Local Loop Wavefront Sensor 654, thus positioned, measures the phasefront of the pseudo-conjugated HEL beam sample after being compensated for both the refractive distortion and warped-surface distortion in the ASE 640. A servo loop (referred to in the art as the "local loop") is closed around OPA 2 (682), which nulls the Wavefront Error at the Local Loop Wavefront Sensor 654 thereby improving HEL irradiance on target.

Correction for the refractive component of non-common path error in the ASE is accomplished as follows. The sampled HEL beam picks up the refractive phasefront distortion in the ASE 640 as it passes up through the ASE, which is reversed (or conjugated) by the Pseudo-conjugator 642. The conjugated sample then passes down through the refractive distortion again canceling the effect of the upper pass. After reflecting off the front surface, the sample passes to the right through the refractive distortion for a third time picking up the same component of refractive ASE distortion that the target signal carries. The Target Loop around OPA 1 then corrects this component of refractive ASE distortion in the sampled HEL beam just as it does with the wavefront signal from the target. When the Local Loop nulls the Wavefront Error at the Local Loop Wavefront Sensor 654, the refractive distortion in the ASE is not present in the HEL beam transmitted to the target.

Correction for the warped surface component of non-common path error in the ASE is accomplished as follows. The sampled HEL beam, after it is phase conjugated by the Pseudo-conjugator 642, picks up the warped-surface phasefront distortion by back reflecting off the front surface of the ASE 640, which is eventually sensed by the Local Loop Wavefront Sensor 654. This component is not sensed by the Target Loop and therefore is not modified by OPA 1 (650). Nulling the Wavefront Error at the Local Loop Wavefront Sensor 654 ensures that the phasefront of the HEL beam, before entering the ASE 640, has a pre-distortion that includes the non-conjugated warped-surface phasefront distortion component from back reflecting off the front surface of the ASE 640. Because front and back reflections off the same surface are phase conjugates of each other, this pre-distorted signal equivalently contains the phase conjugate of the warped-surface phasefront distortion from a front reflection off the front surface of the ASE 640. Therefore, when the HEL beam front reflects off the front surface of the ASE 640 in its path toward the target, this conjugate component in the HEL beam 694 is canceled by the real warped-surface distortion in the ASE 640 and a corrected HEL beam is transmitted to the Target 601.

This approach provides less than perfect correction due to the finite resolution of the Pseudo-conjugator 642 (lateral translation of the rays within each corner cube element and diffraction due to discontinuities between corner-cube elements) and optical aberrations within the Pseudo-conjugator itself.

Figure 7:
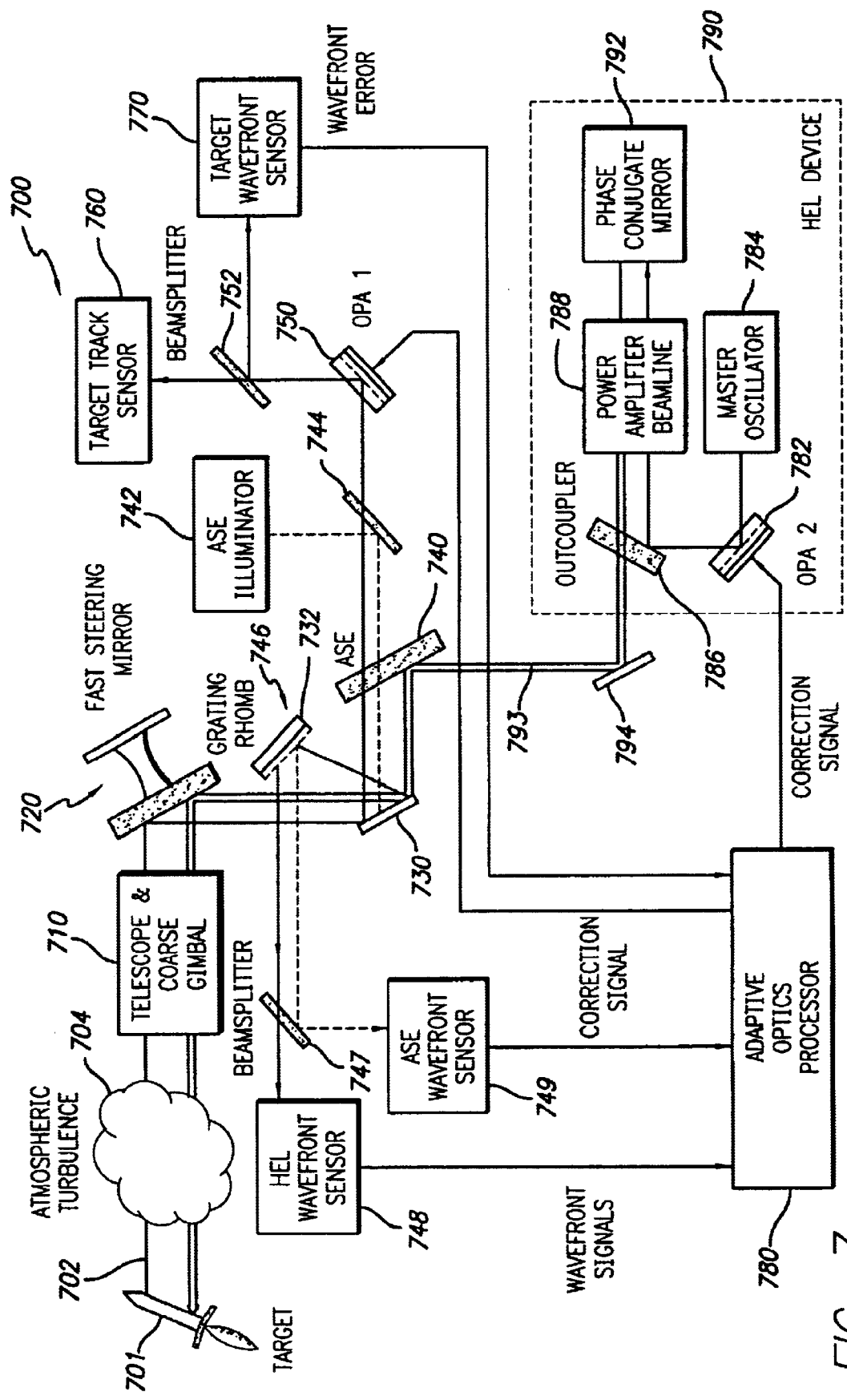
FIG. 7 is a simplified optical schematic block diagram showing a Grating Rhomb approach for correcting non-common path errors in aperture sharing elements in accordance with the teachings of the present invention.

FIG. 7 is a simplified optical schematic block diagram showing a Grating Rhomb approach for correcting non-common path errors in aperture sharing elements in accordance with the teachings of the present invention. FIG. 7 shows a HEL Beam Control System architecture 700 that overcomes the aforementioned problems associated with the pseudo-conjugator approach. In the present scheme, the non-common path errors are sampled with a Grating Rhomb 746 and sensed by a pair of Wavefront Sensors 748 and 749 (the first 748 for the HEL 790 and the second 749 for the ASE 740). The correction is applied at OPA 2 (782) as a pre-distortion in the HEL Beam 793. The use of a low-efficiency Grating Rhomb 746 for accurate wavefront sampling is known in the art (see, for example, E. Treacy, "Optical Pulse Compression with Diffraction Gratings," IEEE J. of Quantum Electronics, Vol. QE-5, No. 9, p. 454, September 1969). Two identical parallel diffraction gratings 730 and 732 are used in the Grating Rhomb 746 component to compensate the deleterious effects of dispersion present in a single diffraction grating. The diffraction gratings are optimally designed such that the angle that the sampled ASE illuminator beam diffracts relative to the surface normal is equal to but opposite the angle that the sampled HEL beam diffracts relative to the surface normal. Under this condition, the map error between the two sampled beams is zero.

The System 700 shown in FIG. 7 is similar to that shown in FIG. 5 with four exceptions: (1) an ASE Illuminator 742 and associated Beamsplitter 744 are used to inject a low power single-transverse-mode laser beam in a backward direction along the target track and wavefront signal path; (2) a Grating Rhomb 746 is included in place of one of the fold mirrors in the high-power beam path on the output side of the ASE 740 to sample both the HEL beam and ASE Illuminator beam; (3) a separate HEL Wavefront Sensor 748 is used to measure the phase of the sampled HEL beam; and (4) a separate ASE Wavefront Sensor 749 is used to measure the phase error on the ASE illuminator beam introduced by refractive effects in the ASE 740. An Adaptive Optics Processor 780 uses the Wavefront Error from the Target Wavefront Sensor 770 to close a servo loop around OPA 1 (750) as before, which nulls the wavefront error at the Target Wavefront Sensor 770 and corrects the Target Track Sensor 760 image.

Pupil relay or reimaging optics in the low-power beam path (not shown) may be used to relay the optical pupil located on OPA 1 (750) to the Target Wavefront Sensor 770, the HEL Wavefront Sensor 748, the ASE Wavefront Sensor 749, and OPA 2 (782) for best adaptive optics correction performance.

A reference phasefront for the outgoing HEL beam is calculated by subtracting the phase profile determined from the Wavefront Signal measured by the ASE Wavefront Sensor 749 from the phase correction applied by the Adaptive Optics Processor 780 to OPA 1 (750). The phase profiles used in this calculation may be adjusted for wavelength differences between the ASE Illuminator 742, the target illuminator (not shown) which is used in conjunction with the Target Wavefront Sensor (770) and the HEL Device 790, such that the reference phasefront corresponds to the HEL Device 790 wavelength. This calculation is performed by the adaptive optics processor 780 in a manner well-known to those of ordinary skill in the art.

The Adaptive Optics Processor 780 then closes a second servo loop around OPA 2 (782) to drive the phasefront measured at the HEL Wavefront Sensor 748 to be identical with the reference phasefront thus calculated. When this loop is properly closed, the HEL output beam will have the correct pre-distortion to compensate for the atmospheric turbulence, without phasefront artifacts due to the non-common paths through the ASE 740, the Outcoupler 786 in the HEL Device 790, or the non-shared optics 794.

It is important to note that the placement of the ASE Wavefront Sensor 749 and ASE Illuminator 742 could be interchanged without changing the function of the ASE non-common path error correction scheme. Such an embodiment may be advantageous for certain applications due to packaging constraints and cross-talk reduction between the ASE and HEL Wavefront Sensors, or other reasons.

Note that, unlike the embodiment shown in FIG. 5, OPA 2 (782) is driven in a closed-loop fashion. As per the embodiment illustrated in FIG. 5, the Target Wavefront Sensor 770 is operated on-null for best performance when operating at low signal-to-noise ratios. Only the high signal-to-noise ratio HEL Wavefront Sensor 748 and ASE Wavefront Sensor 749 are operated off-null.

Figure 8:
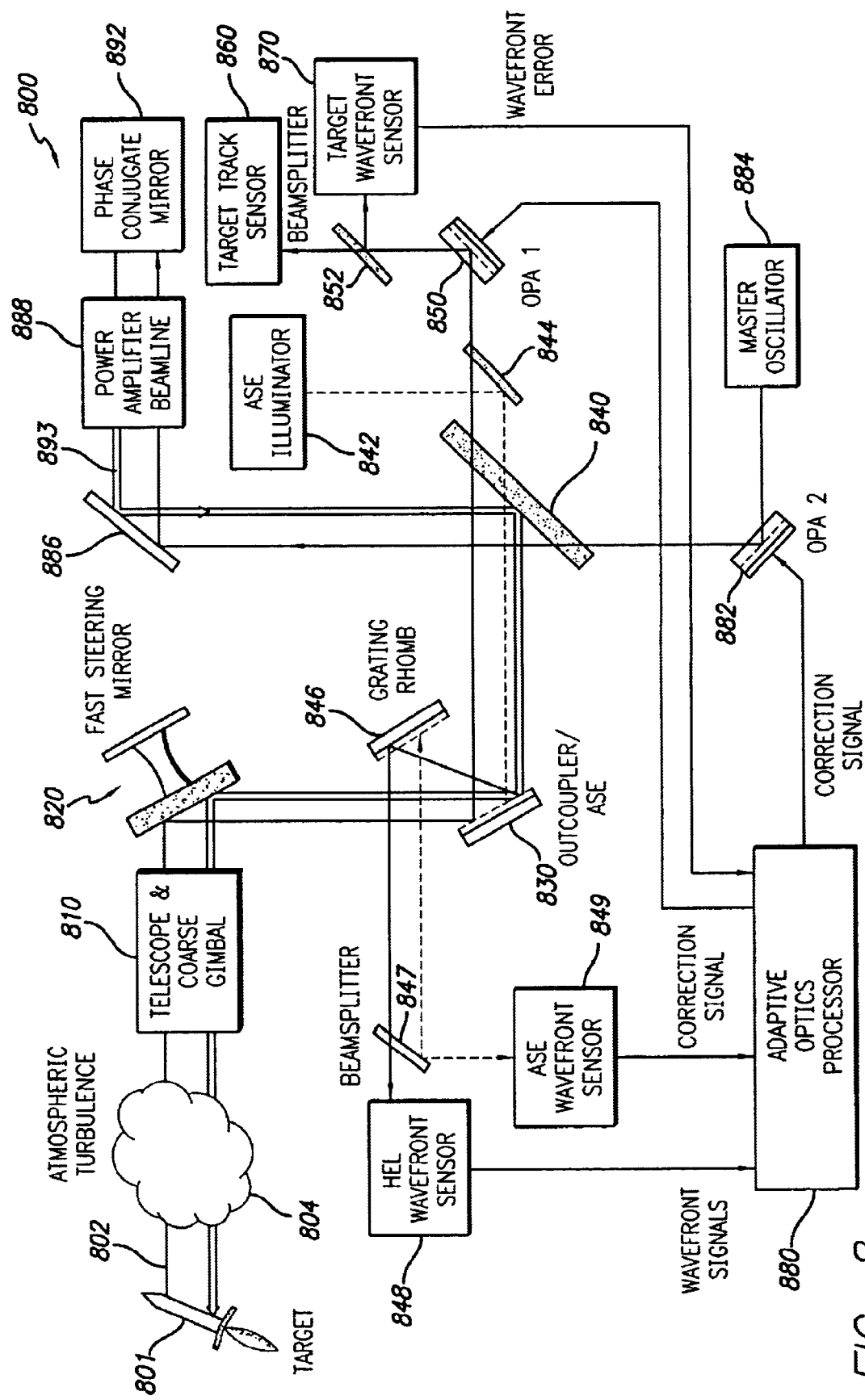
FIG. 8 shows a variation on the Grating-Rhomb approach of FIG. 7, in which the functions of the HEL Outcoupler and Aperture Sharing Element have been combined in a single optical element in accordance with the present teachings.

FIG. 8 shows a variation on the grating-rhomb approach of FIG. 7, in which the functions of the HEL Outcoupler and Aperture Sharing Element have been combined in a single optical element (Outcoupler/ASE) 840 in accordance with the present teachings. In the System 800 of FIG. 8, the ASE Illuminator, Wavefront Sensors, and Adaptive Optics Processor function in the manner described above. This embodiment has the advantage of eliminating one of the high power transmissive optics. The disadvantage is that it limits the selection of outcoupler methods to those that also satisfy the ASE requirements, such as a polarization beamsplitter (Outcoupler function) that also functions as a dichroic beamsplitter (ASE function).

Figure 9:
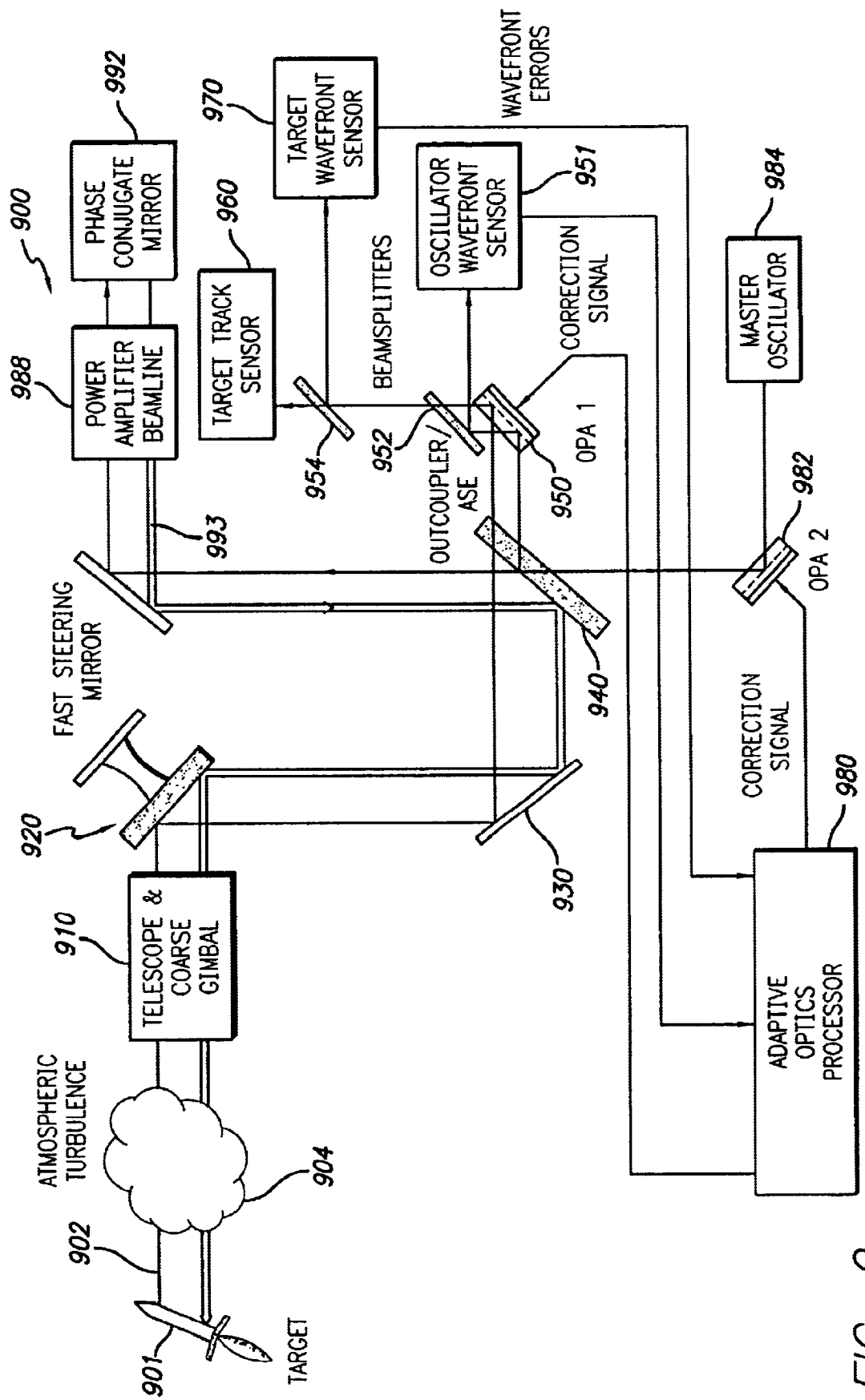
FIG. 9 is an optical schematic/block diagram showing another possible embodiment where the ASE and Outcoupler functions are also combined within a single optical element in accordance with the teachings of the present invention.

FIG. 9 is an optical schematic/block diagram showing another possible embodiment where the ASE and Outcoupler functions are also combined within a single optical element in accordance with the teachings of the present invention. In this System 900, the ASE Illuminator, ASE Wavefront Sensor, HEL Wavefront Sensor, and Grating Rhomb in FIG. 8 are eliminated, and a separate Oscillator Wavefront Sensor 951 is added to the low-power path, sampling the Master Oscillator phasefront after reflection from the Font surface of the Outcoupler/ASE 940 and OPA 1 (950).

Correction for the refractive component of non-common path error in the Outcoupler/ASE is accomplished as follows. The Master Oscillator 894 beam picks up the refractive phasefront distortion in the Outcoupler/ASE 940 as it passes vertically through the Outcoupler/ASE to the front surface. It then makes a second pass through the horizontal refractive distortion of the Outcoupler/ASE after reflection off the front surface. This horizontal refractive distortion component is the same as that seen by the target signal, which is corrected by OPA 1 (950) through the action of the Target Loop servo within the Adaptive Optics Processor 980 (as above in relation to FIG. 5). The Master Oscillator signal reflecting off OPA 1 (950) therefore sees only the vertical refractive distortion from the Outcoupler/ASE 940. The Adaptive Optics Processor 980 closes a Local Loop servo around OPA 2 (982), which nulls the Wavefront Error within this master oscillator signal at the Oscillator Wavefront Sensor 951. In so doing, OPA 2 (982) pre-distorts the Master Oscillator signal entering the Outcoupler/ASE 940 with the conjugate of the vertical refractive distortion from the Outcoupler/ASE element such that, when it passes vertically through the element toward the Power Amplifier Beamline 988, this component of non-common path distortion is corrected. The amplified HEL beam that reflects off the Outcoupler/ASE 940 and is transmitted to the target, therefore, does not contain this vertical refractive distortion component.

Correction for the warped-surface component of non-common path error in the Outcoupler/ASE is accomplished as follows. The Master Oscillator 984 beam sample picks up the warped-surface phasefront distortion after back reflecting off the front surface of the Outcoupler/ASE 940. The Local Loop servo acts to null the Wavefront Error at the Oscillator Wavefront Sensor 951, causing OPA 2 (982) to pre-distort the Master Oscillator beam with the conjugate of the warped-surface distortion from the Outcoupler/ASE 940. This predistorted Master Oscillator beam is also transmitted to the Power Amplifier Beamline 988 and Phase Conjugate Mirror 992 where it is amplified and conjugated. Thus far, two phase conjugation processes have occurred, which produce an amplified HEL beam 993 that contains an unconjugated component of the warped-surface distortion sensed earlier by the sampled Oscillator beam from a back reflection off the front surface of the Outcoupler ASE 940. When this component is front-reflected off this front surface, it corrects the warped-surface distortion from the back reflection. The amplified HEL beam that is transmitted to the target, therefore, does not contain this warped-surface component.

In understanding the correction process for the warped-surface component of non-common path error in the Outcoupler/ASE, it is important to note that the phasefront distortion due to a back reflection off a surface is the phase conjugate of the phasefront distortion from a front reflection off the same surface. The process of pre-distorting a beam with the conjugate of the back reflection distortion, further conjugating that beam, and front-reflecting it off the same surface has the effect of removing the original distortion from the outgoing beam.

The Adaptive Optics Processor 980 may also compute the correct pre-distortion signal using either deterministic or stochastic estimation techniques known in the art, which may be designed to counteract latency in the sensed wavefronts (feed forward), offsets between the location of the wavefront sensing illumination beacon on the target and the desired aimpoint, and other effects.

Pupil relay or reimaging optics in the low-power beam path (not shown) may be used to relay the optical pupil located on OPA 1 (950) to the Target Wavefront Sensor 970, the Oscillator Wavefront Sensor 951, and OPA 2 (982) for best adaptive optics correction performance.

For most adaptive optics applications, it is advantageous to operate the refractive beamsplitting elements within the high power beam path, such as the ASE and Outcoupler, at relatively small angles of incidence (angle between surface normal and incident ray). Minimizing the angle of incidence helps to minimize the aforementioned non-common path errors and may simplify the design of the coatings to maintain a desired beam polarization. Note, the angle of incidence in all figures is shown schematically at 45° for ease of explanation. Accordingly, the present teachings are not limited thereto.

One limitation of the embodiment shown in FIG. 9 results from the nesting of the target and local servo loops. In that embodiment, the target loop wavefront distortions are corrected by driving OPA 1 (950) to null the wavefront error sensed by the Target Wavefront Sensor (970). OPA 1 (950) is therefore responding constantly to the high frequency disturbances caused by atmospheric turbulence. Note that the master oscillator signal sensed at the Oscillator Wavefront Sensor 951, because it too is reflected off OPA 1, also carries the high frequency corrections in the target loop. The local loop must therefore operate at wide bandwidth and local-loop errors will exist due to the latency associated with the local loop responding to the target loop. These latency errors may be minimized by using a crossover network within the local loop. This crossover network would allow OPA 2 (982) to respond at low bandwidth to the errors sensed at the Oscillator Wavefront Sensor 951 but would drive OPA 2 in open-loop response to the high frequency errors sensed by the Target Wavefront Sensor 970. When the open-loop drive signal is applied correctly, the high frequency error sensed by the Oscillator Wavefront Sensor 951 will be nearly the same as that sensed by the Target Wavefront Sensor 970, and persistent errors between the two may be used by the Adaptive Optics Processor 980 to recalibrate the open-loop signal sent to OPA 2 (982) in a very low bandwidth calibration loop.

Figure 10:
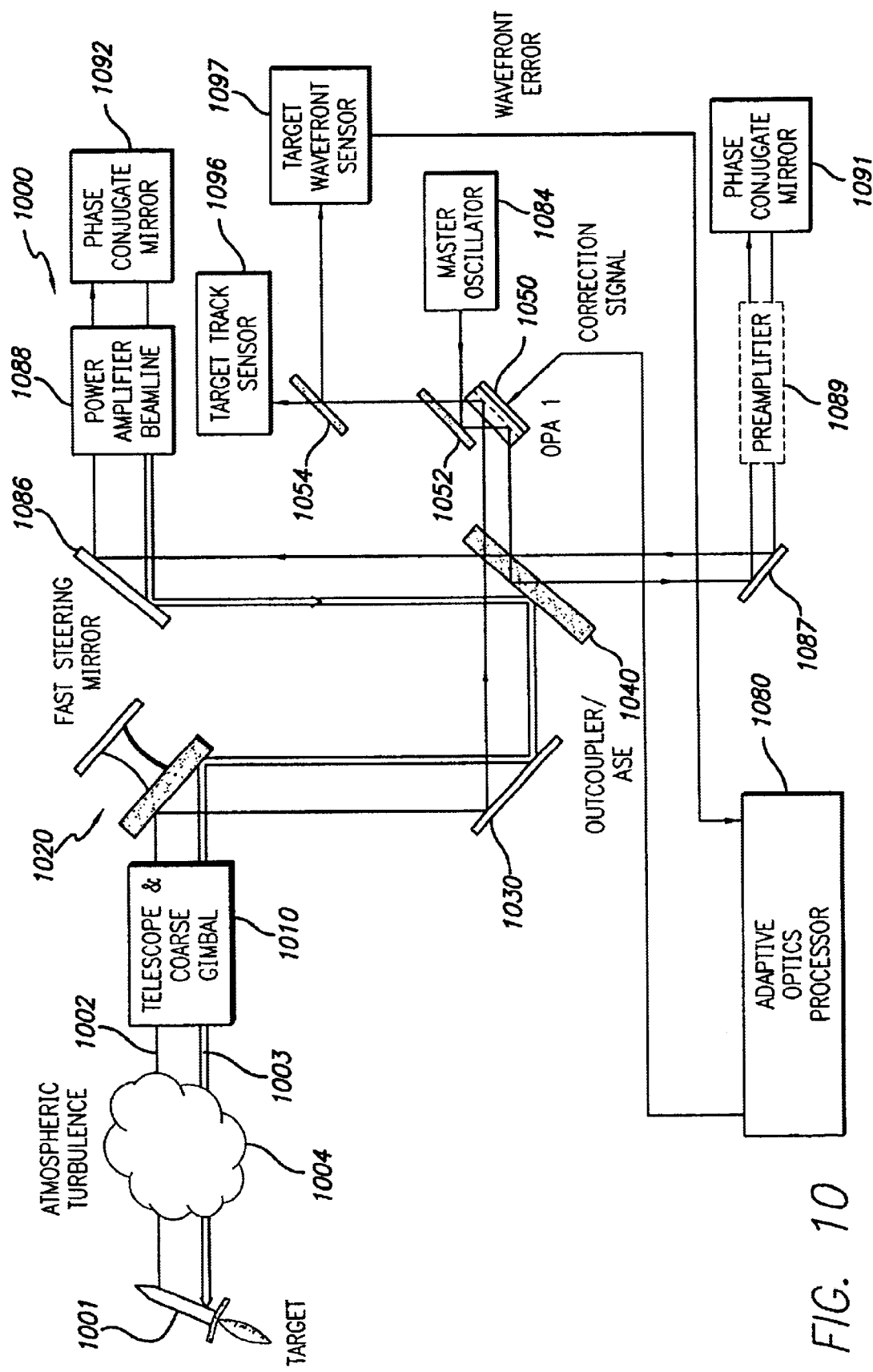
FIG. 10 is an optical schematic/block diagram showing a preferred embodiment of the beam control system of the present invention.

FIG. 10 is an optical schematic/block diagram showing a preferred embodiment of the beam control system of the present invention. The System 1000 of FIG. 10 addresses the latency problem in the local loop depicted in FIG. 9 and described above. This system 1000 replaces the servo-driven local loop adaptive optics elements (Oscillator Wavefront Sensor, OPA 2, and portions of the Adaptive Optics Processor associated with local-loop correction) with a second nonlinear phase conjugate leg. The Master Oscillator 1084 is moved to the Oscillator Wavefront Sensor location shown in FIG. 9; and both OPA 2 and the Master Oscillator are replaced by the second Phase Conjugate Mirror 1092. A preamplifier 1089 may be used in the second phase conjugate leg to overcome reflective losses in the Outcoupler/ASE 1040 on the vertical beam path from the second phase conjugate leg to the first leg containing the Power Amplifier Beamline 1088. With this approach, the local loop is implemented with the bandwidth and spatial resolution of the phase conjugate mirror. The bandwidth of the PCM can be orders of magnitude higher than the target loop, effectively eliminating the aforementioned latency problem. The resolution of the PCM may be sufficiently high to accommodate high slope corrections and discontinuities in the phasefront.

In this embodiment, the target loop adaptive optics correction is identical to that described above with respect to FIG. 9. Correction for the non-common path error in the Outcoupler/ASE 1040 follows the same general approach described earlier, but with some differences as indicated below. A reference beam from the Master Oscillator 1084 is first reflected off a beamsplitter 1052 then off OPA 1 (1050), where it picks up the conjugate of the atmospheric distortion as well as the conjugate of the horizontal portion of the refractive component of non-common path error. The beam is then transmitted through the Outcoupler/ASE 1040 to the front surface, at which point the error associated with the horizontal refractive non-common path error is corrected. This beam then picks up the warped-surface distortion from the Outcoupler/ASE 1040 by back-reflecting off the front surface of this element. Finally, it picks up the vertical refractive component of non-common path error before entering the second phase conjugate leg at the bottom of the figure.

The beam then enters the second phase conjugate leg where it may be preamplified and where the optical phasefront is reversed upon reflection by the first Phase Conjugate Mirror 1091. The beam exiting this leg now carries the unconjugated atmospheric distortion, as well as the conjugate of the vertical refractive distortion and the conjugate of a back-reflection off the front surface of the Outcoupler/ASE 1040.

Next, it passes vertically through the Outcoupler/ASE 1040 where the vertical refractive component of non-common path error is corrected. The beam is then conjugated and amplified in the second phase conjugate leg at the top of the figure. At this point, the beam carries only the conjugated atmospheric distortion and the unconjugated back reflection off the front surface of the Outcoupler/ASE. As described before, this second component is the same as the conjugate of a front reflection off the front surface, which is finally corrected when the beam front-reflects off the front surface of the Outcoupler/ASE 1040 on its way to a Fast Steering Mirror 1020 and Telescope & Coarse Gimbal 1010. Upon exiting the HEL beam director, the HEL beam 1003 carries only the conjugate of the atmospheric distortion, which is the desired phasefront to correct for this aberration and produce maximum irradiance on target.

Because the high power laser beam follows the line of sight of the master oscillator beam, the high power beam may be desirably offset from the target aimpoint by steering the master oscillator beam with mechanical means (e.g., steering mirror) or non-mechanical means (additional OPA), not shown.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A beam control system comprising:
    first means for detecting aberration in a first beam of electromagnetic energy without amplification thereof and providing an error signal in response thereto;

second means responsive to said error signal for providing a conjugate correction signal;

third means responsive to said conjugate correction signal for providing a predistorted reference beam;

fourth means including an amplifier for amplifying said predistorted reference beam to provide an amplifier distorted reference beam; and fifth means for conjugating said amplifier distorted reference beam to provide said correction signal to said amplifier whereby amplifier provides an output beam predistorted to correct for said aberration in said first beam.

2. The invention of claim 1 wherein said first beam is a return beam comprising a reflection of a beam.

3. The invention of claim 2 wherein said first means includes a target wavefront sensor.

4. The invention of claim 3 wherein said first means includes a telescope in alignment with said target wavefront sensor.

5. The invention of claim 4 wherein said first means includes an aperture sharing element between said telescope and said target wavefront sensor.

6. The invention of claim 5 wherein said first means further includes an optical phased array disposed between said aperture sharing element and said target wavefront sensor.

7. The invention of claim 5 further including means for correcting for noncommon path errors in said aperture sharing element.

8. The invention of claim 7 wherein said means for correcting for noncommon path errors in said aperture sharing element includes a pseudo-conjugator adapted to sample said beam output by said amplifier via said aperture sharing element.

9. The invention of claim 8 wherein said means for correcting for noncommon path errors in said aperture sharing element further includes a local loop wavefront sensor adapted to receive a beam retro-reflected by said pseudo-conjugator and provide an error signal in response thereto.

10. The invention of claim 7 wherein said means for correcting for noncommon path errors in said aperture sharing element includes a Grating Rhomb adapted to sample said beam output by said amplifier.

11. The invention of claim 10 wherein said means for correcting for noncommon path errors in said aperture sharing element further includes a second wavefront error sensor for detecting aberration in said output beam.

12. The invention of claim 11 wherein said means for correcting for noncommon path errors in said aperture sharing element further includes a third wavefront error sensor for detecting aberration in said output beam due to said aperture sharing element.

13. The invention of claim 5 wherein said aperture sharing element is an output coupler or outcoupler.

14. The invention of claim 13 further including means for sensing aberrations in said predistorted reference beam due to said aperture sharing element.

15. The invention of claim 1 wherein said second means includes an adaptive optics processor.

16. The invention of claim 1 wherein said third means includes a master oscillator and an optical phased array.

17. The invention of claim 1 wherein said fifth means includes a phase conjugate mirror.

18. The invention of claim 17 wherein said second means includes a second phase conjugate mirror.

19. A method for controlling a beam including the steps of:

detecting aberration in a first beam of electromagnetic energy without amplification thereof and providing an error signal in response thereto;

providing a conjugate correction signal in response to said error signal;

providing a predistorted reference beam in response to said conjugate correction signal;

amplifying said predistorted reference beam to provide an amplifier distorted reference beam; and conjugating said amplifier distorted reference beam to provide said correction signal to said amplifier whereby amplifier provides an output beam predistorted to correct for said aberration in said first beam.

\* \* \* \* \*